United States Patent
Cristofich et al.

(10) Patent No.: US 6,269,346 B1
(45) Date of Patent: *Jul. 31, 2001

(54) STOCK OPTION CONTROL AND EXERCISE SYSTEM

(75) Inventors: John Cristofich, Bridgewater; Susan Warner, Hamilton; Deborah Howard, Jackson; Karen Berkley, Franklin Park, all of NJ (US)

(73) Assignee: Merrill Lynch, Pierce, Fenner & Smith, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/386,987

(22) Filed: Aug. 31, 1999

Related U.S. Application Data

(63) Continuation of application No. 08/935,709, filed on Sep. 23, 1997, which is a continuation-in-part of application No. 08/487,902, filed on Jun. 7, 1995, now Pat. No. 5,671,363, and a continuation-in-part of application No. 07/938,939, filed on Sep. 1, 1992, now abandoned.

(51) Int. Cl.[7] .................................................. G06F 17/60
(52) U.S. Cl. ................................ 705/37; 705/35; 705/36
(58) Field of Search .......................................... 705/35–37

(56) References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno . |
| 4,674,044 | 6/1987 | Kalmus . |
| 4,700,297 | 10/1987 | Hagel, Sr. . |
| 4,774,663 | 9/1988 | Musmanno . |
| 4,815,741 | 3/1989 | Small . |
| 4,823,265 | 4/1989 | Nelson . |

(List continued on next page.)

FOREIGN PATENT DOCUMENTS

0416482A2 * 3/1991 (EP) ................................ G07F/7/10

OTHER PUBLICATIONS

Mid–South investors well–versed in options trading, Yawn, David, Memphis Business Journal, v12, n8, p13(1), Jul. 1990.*

"Agreement for Services Between PepsiCo, Inc. and Merrill Lynch, Pierce, Fenner & Smith Incorporated dated as of Jul. 1, 1990" dated Oct. 31, 1990.

"Proposal to Convert PepsiCo's Sharepower Plan to Merrill Lynch's Generic Stock Option Plan Administrative System, vol. One, Oct. 7, 1994" of Oct. 7, 1994.

*Primary Examiner*—James P. Trammell
*Assistant Examiner*—Yehdega Retta
(74) *Attorney, Agent, or Firm*—Hopgood, Calimafde Judlowe & Mondolino

(57) ABSTRACT

A system and method for managing a plurality of stock option accounts each for a plurality of participants. The system invokes a particular option plan defined in the system that governs the transaction choices available to each participant. The governing option plans are defined by the sponsoring company in terms of grant, vest and expiration date for the option contracts, and are defined in the system via a database of option holding information for each participant and an axiomatic rule system defining the criteria under which a given participant can exercise given options under the particular plan. The system implements the plans for multiple client companies providing several distinct modes for option exercise by the participant. The system preferably also allows for disbursement of proceeds in a currency different than that in which the underlying security for the option is traded, real time execution of the option transaction, and/or simulating the outcomes of different manners in which the participant may exercise vested options and the resulting economic outcome (disbursement, taxes, transaction fees).

13 Claims, 7 Drawing Sheets

U.S. PATENT DOCUMENTS

| | | |
|---|---|---|
| 4,953,085 | 8/1990 | Atkins . |
| 5,077,665 | 12/1991 | Silverman . |
| 5,126,936 | 6/1992 | Champion . |
| 5,132,899 | 7/1992 | Fox . |
| 5,136,501 | 8/1992 | Silverman . |
| 5,206,803 * | 4/1993 | Vitagiliano et al. .................. 364/408 |
| 5,210,687 | 5/1993 | Wolfberg . |
| 5,227,967 | 7/1993 | Bailey . |
| 5,233,514 | 8/1993 | Ayyoubi . |
| 5,262,942 | 11/1993 | Earle . |
| 5,270,922 | 12/1993 | Higgins . |
| 5,297,032 | 3/1994 | Trojan . |
| 5,315,634 | 5/1994 | Tanaka . |
| 5,671,363 | 9/1997 | Christofich . |
| 5,710,889 | 1/1998 | Clark . |
| 5,765,144 | 6/1998 | Larche . |
| 5,781,654 | 7/1998 | Carney . |
| 5,826,243 | 10/1998 | Musmanno . |
| 5,890,141 | 3/1999 | Carney . |

* cited by examiner

STOCK OPTION CONTROL AND EXERCISE SYSTEM

This application is a continuation of co-pending application Ser. No. 08/935,709, filed Sep. 23, 1997, which is a continuation-in-part of application Ser. No. 08/487,902, filed Jun. 7, 1995, now U.S. Pat. No. 5,671,363, and application Ser. No. 07/938,939, filed Sep. 1, 1992, now abandoned (the disclosures of which are incorporated herein by reference).

BACKGROUND OF THE INVENTION

The present invention generally relates to computer controlled account management systems for stock option management, and more particularly to a data processor for implementing a management control system for tracking and processing a plurality of segmented stock option accounts corresponding to individual participants in a company sponsored stock ownership plan.

For many years, publicly owned companies have provided payment to upper level executives in the form of options to purchase shares of stock in the company for whom they were employed at discounts from the prevailing market price. These stock option are attractive for many reasons. For one, the option is a form of deferred payment that provides certain tax benefits and allows the individual to control the times during which the income is derived. In addition, the opportunity to buy stock in the company is an additional incentive to the option recipient to work to increase the value of the company, and so also the value of the stock options.

Early forms of option plans were limited to scope and available only to a handful of key executives. Indeed, the use of options as a form of compensation was routinely limited to the officers of a corporation, while the remaining employees were either granted stock pursuant to pension plans or, more often than not, unable to participate in company sponsored ownership. As alternative forms of compensation grew in popularity, companies were increasingly interested in providing payment to select employees in untraditional forms. Concepts such as flex time, position sharing, benefit tailoring, and others became the terminology of personnel departments for mechanisms to address staffing needs in a cost efficient manner.

More recently, companies are examining the possible broader use of stock option-based compensation to cover greater numbers of employees in order to stretch out staffing dollars and to provide remuneration to employees in a form particularly desired by many staff members. Although greeted with substantial enthusiasm, the problems in implementing a company sponsored stock option plan are daunting. As the number of participants grows, tracking salient data becomes increasingly complex. For the most part, companies are not equipped to handle the transactional attributes of stock option processing on a scale above a handful of participants. Each of the options (or each block of options) for each grant to each participant in the plan must be individually tracked for proper delineation of such parameters as the granting, vesting, exercise, and expiration dates, and the particular strike price for which the option right was granted. Also, the practical exercise of an option requires the use of a brokerage house and an established exchange for trading and consummating the options and the underlying security in accordance with the plan attributes.

The complexities of option account processing increase disproportionately when more than one company is involved; this is especially true for multinational companies working within the borders of multiple countries—each with its own set of legal requirements on stock ownership and tax consequences for resident employees. Heretofore, there has been an absence of processing capabilities available to address the management of a multi-country, multi-company stock option account compensation plan for a plurality of individual accounts. In addition, stock option plans for multinational corporations, or for multinational employees (i.e., employees who work for one or more companies in two or more countries), have the added practical problem of exercising options where the underlying security and the funds are in different currencies.

Besides currency differences, from the participant's point of view there can be significant uncertainties in how to exercise options because options may be granted in qualified (i.e., qualifying for preferential tax treatment) or non-qualified plans, and the option may be exercised so that the participant receives the underlying security, a cash disbursement representing essentially (less taxes, commissions, and fees) the difference between the strike price and the then present market price of the underlying security, or some combination thereof. It would be beneficial to the participant if she could simulate various financial outcomes (e.g., including estimated taxes, fees, or cash disbursements, or combinations thereof) to arrive at what is best for the participants financial needs precipitating exercise of the options.

OBJECTS AND SUMMARY OF THE INVENTION

It is an object of the present invention to provide a data processing system for managing a plurality of individual accounts directed to the holding and transacting of options for the purchase of securities in accordance with pre-established plan criteria.

It is another object of the present invention to provide a data processing apparatus for managing the implementation of one or more company stock option plans on a continuous basis.

A further object of the present invention to provide a system for processing plan constraints in a manner to provide responsive transactions in accordance with plan dictates and select inputs from plan participants.

An additional object of the present invention to provide a cashless transaction for the exercise of vested options in accordance with plan terms, through the use of a linked brokerage account for the plan participants.

Still further objects of this invention include providing such apparatus and systems that can function across currency differences, provide option execution in real time, allow the participant to simulate different exercise scenarios to define the desired parameters for the execution of the options, or a combination thereof.

The above and other objects of the present invention are realized in a data processing system including controlling stored programming directed to the managing and tracking of a plurally of individual accounts, current stock pricing, individual biographic data, company option plans and current withholding and other tax requirements. For each participant in a given plan, the system tracks the number of options to purchase stock that have been granted, the grant date, the number vested and vest date, and the number expired and date of expiration. At participant determined dates, the system implements a participant requested exercise of select options in accordance with the governing plan, e.g., option price, withholding percent, etc.

In accordance with the varying attributes of the present invention, the system uses a corresponding brokerage account held in the participant's name to implement the actual trades of stock necessary for the option exercise, with the market sale price on the exchange used to pay the plan sponsor (company) the option price, and remaining proceeds as compensation to the participant.

The foregoing features of the present invention may better appreciated from the following detailed description of a specific illustrative embodiment thereof, presented in conjunction with the following drawings:

DETAILED DESCRIPTION OF SPECIFIC EMBODIMENTS

First briefly in overview, the present invention is directed to managing the operations associated with the broad scale implementation of individual stock option accounts for different companies and in accordance with distinct plans. The implementation is governed by an integrated control program implementing commands in response to program logic and current environmental inputs. The system maintains in memory records of participating individuals having present or future rights to exercise options of select stock, as well as a plurality of distinct option plans that dictate the implementation of the plan participants' rights in exercising the options granted to the participants. Processing is both time-driven and event-driven; for example, periodic updates to the participant's records occur at regular (preferably at least daily) intervals. In addition, select inputs preferably trigger system processing, e.g., option exercise request or target price acquisition.

A sophisticated data processing system is used for this implementation, which preferably includes one or more microprocessor-based central processor units (cpu) interconnected with multiple I/O (input/output) controllers, segmented memory in both semiconductor and magnetic disk form (i.e., immediate memory and permanent storage), communication ports for distributed processing and real time input communication for, e.g., incoming stock quotes (i.e., real time quotation of the option's underlying security price). The controlling program can be written in various commercially well-known programming languages (e.g., Cobol, "C", Pascal, etc.), as long as the resulting executable version is compilable in a manner compatible with hardware selected for the central processor and any peripheral work stations. For example, excellent results can be expected implementing this invention using Cobol II programmed and running on an IBM 3090 (Sierra) system platform.

Figure 1:
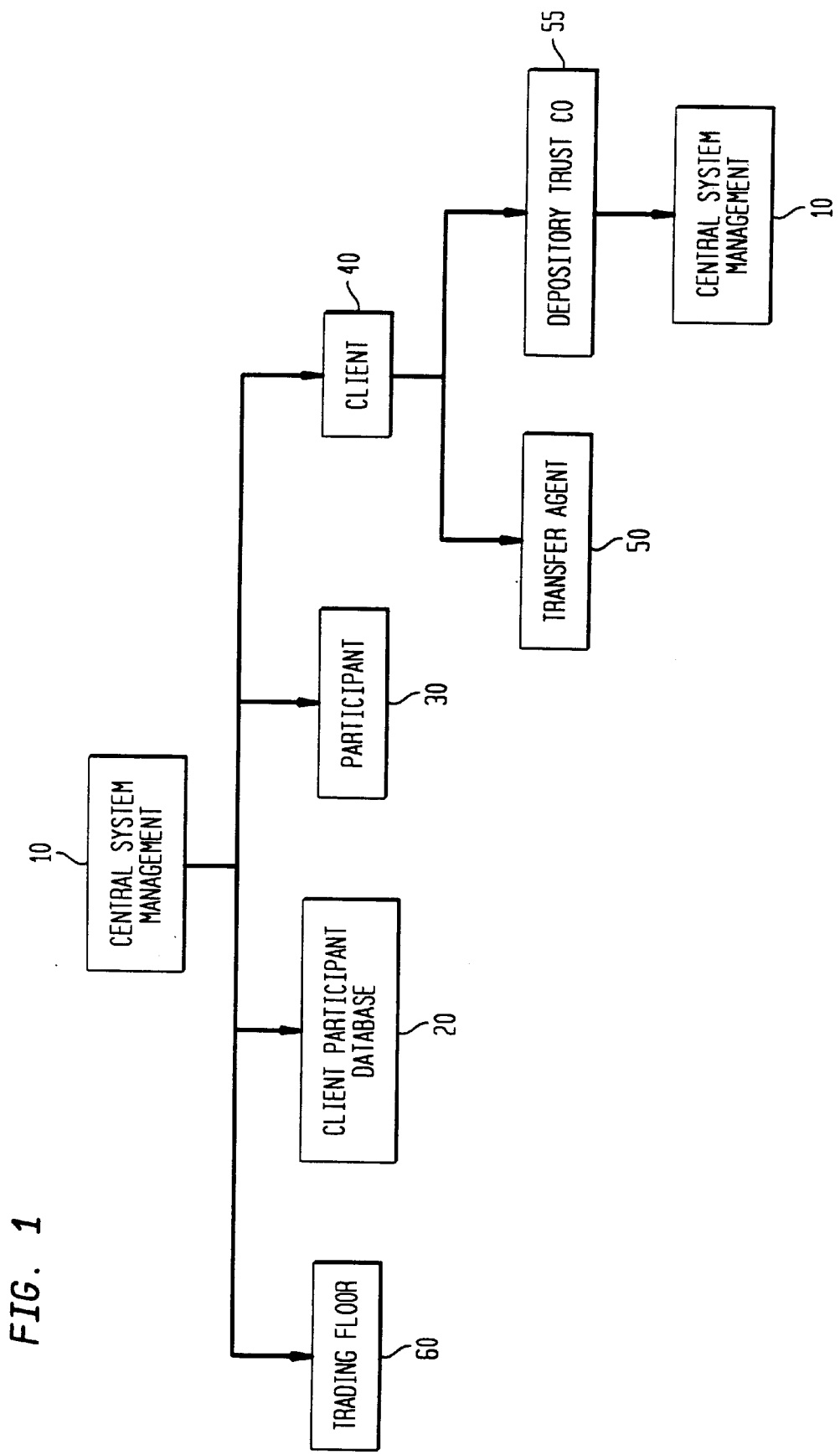
FIG. 1 provides a functional block diagram of the operative activities encompassed by the present invention.

With the foregoing overview in mind, attention is directed to FIG. 1 which provides a block diagram of the processing relationship between the various institutions involved in the operation of the present invention. More particularly, the system proprietor operates the system at a centralized location, block 10 where the central processing hardware is maintained. As stated above, the invention is directed to a plurality of separate accounts involving at a minimum segregated files on the participant and participant's brokerage account. This will of course require database 20 for maintenance of past and updated account files.

Continuing with FIG. 1, the individual blocks are interconnected with lines indicating channels of communication. For example, each participant 30 has access to a corresponding account record via system management and may use this channel for entering option exercise orders, submit cash for execution, or request records for tax purposes. The system proprietor is operating the system for the benefit of one or more separate client companies, block 40, each with a diverse set of processing requirements for their respective group of employees. In this regard, the system incorporates communication channels for the client 40, the participants 30, and the system manager 10.

Actual transactions made in accordance with the dictates of the present invention are processed practically through one or more transfer agents 50, typically a bank or other trustee formed for the transactions involved. The transfer agent releases newly issued or treasury shares of stock in the client company, which are passed to the system manager (or associated broker) either directly or through a depository trust company (DTC), block 55. Finally, the system is linked via per se well-known communications systems to one or more exchanges, block 60, for execution of the transactions of shares in accordance with plan dictates, client constraints, participant requests, and brokerage account limitations.

To understand the logic commands governing the implementation of the present inventive system, a brief description of the salient terms may be helpful and thus provided in Table 1 below:

TABLE I

1. Option(s). Options are granted to one or more eligible employees at a strike price set on the grant date. The options have a limited lifetime, and expire at the end of their term if not exercised. An option is a right to a purchase a set number of shares of the underlying security at the strike price.

2. Vesting Period. Options granted to an employee are not exercisable until the completion of a vesting period, typically at least one year after grant date. Sponsors may specify their own vesting schedule. Accordingly, each participant may have both vested and non-vested options in her account.

3. Exercise. An option is typically exercised by paying the purchase price for up to the number of shares granted in the option at the strike price, so the person exercising the option then owns the underlying security. Option exercise methods for employee stock option plans typically include stock swap, traditional participant cash payments from private resources, as well as the effectively immediate sale of underlying security after exercise to pay for the grant price (also known as the "cashless" exercise method because the participant need not actually buy and then sell the stock; the participant effectively receives what would have been the disbursement for such a transaction). For global operations, the system must implement country specific restrictions that may inhibit cash or cashless transactions by law.

4. Income. Upon exercise, participants realize cash disbursements, such as the spread between the option grant price and the exercise price (fair market value on exercise date), as taxable income. Plan sponsors typically deduct this spread as a compensation expense. The income and expense realized may be governed otherwise by IRS, SEC, and/or the particular plan regulations. Participants can also defer income by exercising the option and receiving the stock.

5. Withholding Taxes. Taxes on each participant's exercise income are withheld at rates specified by the plan sponsor. Funds to pay withholding taxes are raised through the sale of a number of the shares obtained through the exercise, share withholding, cash on deposit, or swapping of shares of stock already owned, with the resulting funds forwarded to the plan sponsor for payment to taxing authorities.

6. Brokerage Services. Each participant is required to open a brokerage account to facilitate exercises. The net number of shares obtained through the exercise is deposited into the account. Participant may hold the shares or sell them at their convenience.

7. Exercise Costs. Each exercise entails a variety of possible exercise costs, against which some percentage of the shares obtained on exercise are sold. These costs can include:

Option price. Participants owe their employer, which issues the stock they receive on exercise, the option price times the number of options being exercised. (e.g., 100 options with a grant price of $37.50 equal an option price of $3,750.00).

Withholding Taxes. As described above, the spread on an option is taxable as ordinary income. Some option awards and international participants, however, may not be subject to taxation on this income.

Commissions and Fees. The exercise of stock option and sale of shares to cover exercise costs entail transaction fees. Plan sponsors may choose to pay these commissions and fees on behalf of their stock option plan participants, or specify that participants pay for these through a cash or stock deposit or through the sale of shares obtained from the exercise.

Figure 2:
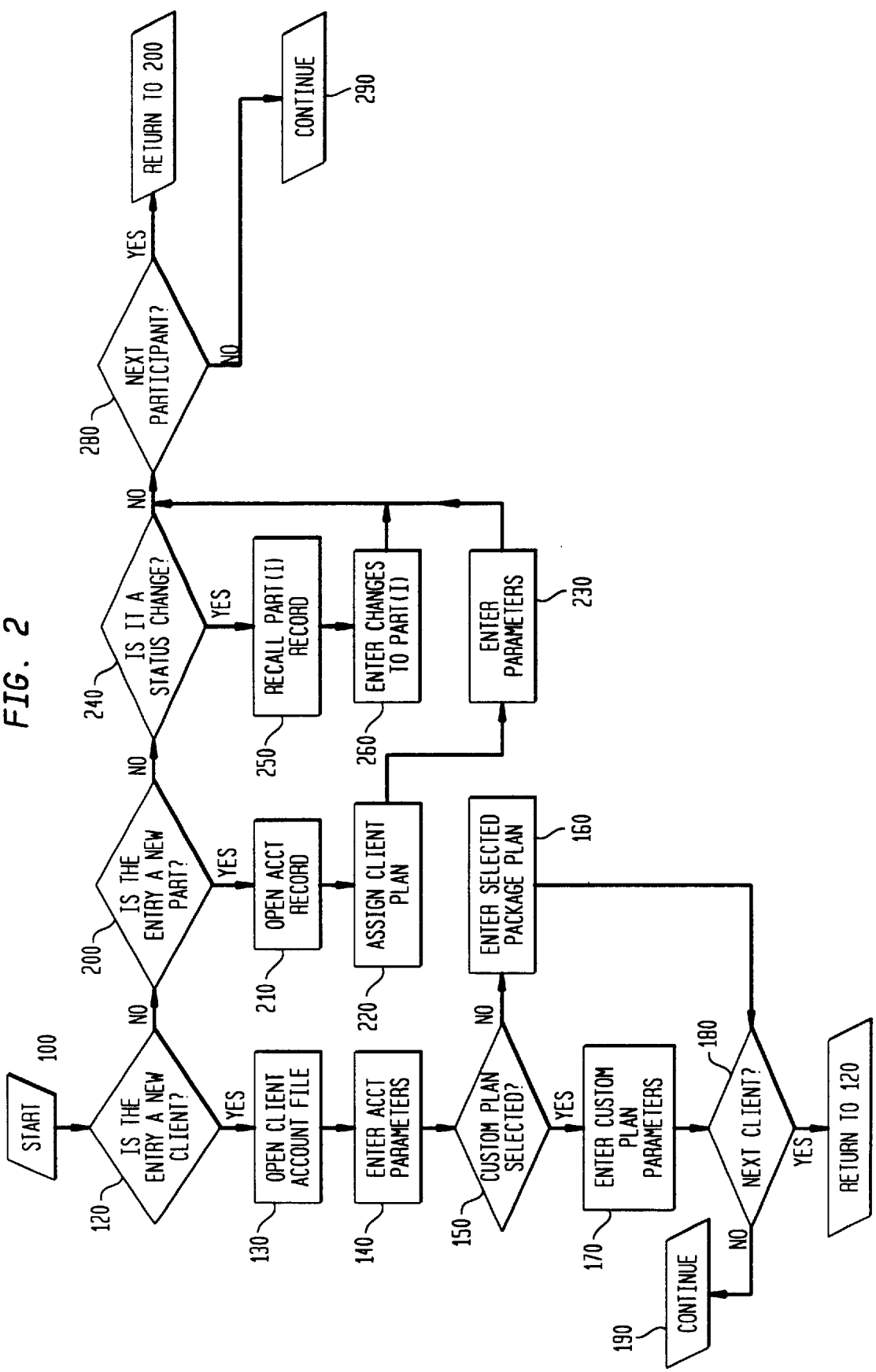
FIG. 2 provides a logic flowchart of the participant attribute module of the present invention.

Now turning to FIG. 2, the set up module is presented in flowchart delineating the entry of set up data for a new or updated client/participant account file and associate operations. More particularly, logic begins at block 100 and branches to the database manager module. This manager system permits access to the database of existing accounts, clients and participant records for retrieval and update purposes. As the population of clients/participants grow, the database manager will be automatically invoked via the link to system management for update processing.

For the purposes of the preset discussion, the database manager is used to add new records and files for new client and/or participants and update existing files via test 120. A positive response to test 120 (indicating a new client entry, i.e., a new company interested in starting a plan for its participating employees that permit the granting and transacting of stock options on an ongoing managed basis) branches logic to block 130 wherein a designated addressable file location is allocated in the database for client profile parameters; these parameters as ascertained by the system manager are then entered at block 140.

The exemplified system described herein includes several prepackaged Plans for delineating the rights and obligations of the client to the participants regarding option processing. The Plans will be available to the new client as set forth in test 150, where a negative response invokes the selection process from the received client criteria. Based thereon, the selected Plan is entered into the database for governing future transactions for the new client. Alternatively, the client may customize a stock option Plan in accordance with the client's particular needs and interests. This is done via a positive response to test 150 and the entry of custom Plan parameters at block 170. Processing then continues to the next client (new) test 180 or to continue block 190.

Continuing with FIG. 2, assuming a negative response to test 120, logic branches to test 200 which identifies whether the participant is new or existing within the database for that client. A positive response to test 200 (new participant) continues to block 210 for open/entry of a new record corresponding to that participant. The participant is then logically concatenated to the proper client, block 220 thus inheriting all the client delineated option Plan features previously entered for that client. Thereafter, the system seeks the remaining defining parameters for that participant for storage within the addressable database record, block 230. This continues for the next participant entry in que, test 280.

If the participant is already in the system ("no" to test 200), logic branches to test 240 to determine if a status change has been made to the participant's file. A status change is directed to the parameters stored for that participant and can include biographic, demographic or payment information such as a promotion, vesting of select options, termination, expiration of options, exercising options, or other changes. If a positive response is received, the salient records are accessed, block 250, and the appropriate changes entered into the records, block 260.

In the foregoing logic structure, the client and participant are system-defined through a specified option Plan and in fact this Plan may be modulated and incremented in accordance with the client so that a plurality of differing Plans are implemented by the system (e.g., Plan(I), wherein I is an indexing variable for the differing clients using the option management system). In this context, the Plan can incorporate the profile of information shown in Table II in the processing of option accounts for the various participants. Each plan managed by the system preferably includes (i) a set of parameters for such purposes as identifying and/or categorizing the necessary particulars for each participant and their option(s), (ii) a database containing each of these parameters, and (iii) an axiomatic system at least in part defining the plan criteria for the exercise of the options by a plan participant.

TABLE II

| Description | Resp. | Size |
|---|---|---|
| PLAN LEVEL RULES | | |
| Plan name | Mrking | 50 Chars |
| Plan source code | Oper | 9 Chars |
| Plan stock cusip | Oper | 8 Chars |
| Plan stock description | Oper | 20 Chars |
| VRS | Mrking | Yes or No |
| VRS phone number | Oper | 999-999-9999 |
| Annual or quarterly statements | Mrking | Annl or Qtrly |
| Customer letter short name 1 | Systems | 20 Chars |
| Customer letter short name 2 | Systems | 20 Chars |
| Customer letter phone number | Systems | 999-999-9999 |
| Account Assignment | Oper | Yes or No |
| Plan active date | Systems | CC/YY/MM/DD |
| Incentive Compensation | Mrking | Yes or No |
| Fractional grants | Mrking | Yes or No |
| Allow zero grants | Mrking | Yes or No |
| Payroll data required for exercise | Mrking | Yes or No |
| Maximum year to date exercises | Mrking | 999 |
| Minimum exercise amount | Mrking | 9,999,999.9999 |
| Maximum exercise amount | Mrking | 9,999,999.9999 |
| Target price exercise duration (d) | Mrking | 999 |
| Exercise blackout start date | Mrking | CC/YY/MM/DD |
| Exercise blackout end date | Mrking | CC/YY/MM/DD |

TABLE II-continued

| Description | Resp. | Size |
|---|---|---|
| Limit price % | Mrking | 9.9999 |
| 1st sale inflation % | Mrking | 9.9999 |
| 1st sale minimum commission | Mrking | 999.99 |
| 1st sale commission % | Mrking | 9.9999 |
| 2nd sale inflation % | Mrking | 9.9999 |
| 2nd sale minimum commission | Mrking | 999.99 |
| 2nd sale commission % | Mrking | 9.9999 |
| Repeat following for each valid exercise type for the plan (max. 30 types) | | |
| Exercise type | Mrking | 6 Chars |
| Exercise code | Systems | 1 Char |
| Exercise description | Mrking | 30 Chars |
| COUNTRY RULES | | |
| Country number | Oper | 999 |
| Country Name | Mktg | 30 Chars |
| Allow VRS exercises? | Mktg | Yes or No |
| New account form required? | Mktg/Legal | Yes or No |
| Force share delivery | Oper/Legal | Yes or No |
| Special user authority needed | Oper | Yes or No |
| Special userid's | Oper | 8 Chars |
| Repeat following for each valid exercise allowed (max. 30 types) | | |
| Valid exercise type | Mrking | 6 Chars |
| Valid exercise code | Systems | 1 Char |
| Valid exercise description | Mrking | 30 Chars |
| GRANT RULES | | |
| Grant date | Mrking | CC/YY/MM/DD |
| Grant price | Mrking | 99,999.99999 |
| Grant expiration date | Mrking | CC/YY/MM/DD |
| Maximum year to date exercises | Mrking | 999 |
| Minimum vesting amount | Mrking | 9,999,999.9999 |
| Vested outstanding cusip | Oper | 8 Chars |
| Vested outstanding account | Oper | 9 Chars |
| Vested lapsed cusip | Oper | 8 Chars |
| Vested lapsed account | Oper | 9 Chars |
| Unvested outstanding cusip | Oper | 8 Chars |
| Unvested outstanding account | Oper | 9 Chars |
| Unvested lapsed cusip | Oper | 8 Chars |
| Unvested lapsed account | Oper | 9 Chars |
| Exercise cusip | Oper | 8 Chars |
| Exercise account | Oper | 9 Chars |
| EMPLOYEE STATUS RULES | | |
| Status code | Mrking | 1 Char |
| Status description | Mrking | 30 Chars |
| Exercise cutoff amount | Mrking | 9999 |
| Exercise cutoff type | Mrking | Years/Months/Days |
| VESTING RULES | | |
| Grant date | Mrking | CC/YY/MM/DD |
| Status code | Mrking | 1 Char |
| Vesting rate | Mrking | 9.9999 |
| Vesting calculation type | Mrking | Truncate or Round |
| Special vesting check | Systems | Yes or No |
| 100% vesting date | Systems | CC/YY/MM/DD |
| Repeat following for each event date (up to 25 event dates) | | |
| Event vesting date | Mrking | CC/YY/MM/DD |
| Event vesting rate | Mrking | 9.9999 |

In the above Plan profile, the column "Resp." indicates the specifying division of the system proprietor responsible for the variable data, e.g., "marketing". VRS represents a Voice Response System that allows direct phone link to the system options for the participant via touch-tone entry, preferably in multiple languages. The column "Size" indicates an embodiment of the record format size and/or format for database management.

Additional plan level rules (or other rules) can be implemented as required by a particular system or which the administrator requires or desires. For example, other preferred plan level rules include the type of option grant, an option grant suffix, whether real-time trading (described below) is allowed by the plan for the participant, and the particular currency type (e.g., foreign currency transactions, as described below), the language in which the VRS responds as a default when the participant phones, termination letters, and option expiration letters. The option grant suffix is useful when, such as preferred herein, the system recognizes options by their grant date because different types of options, or options having different conditions for exercise, may be granted to the participant on the same date; hence, the suffix can permit the system to distinguish between different types of options granted to the same participant on the same date. The parameters for termination letters and option expiration letters are equivalent to toggles prompting whether the system should issue letters to the participant as notification, respectively, that participation in the plan has been terminated (and, for example, how the options can be exercises in the future) and that particular option(s) granted are due to and/or have expired. Similarly, the grant rules can include parameters for the option grant type and the option grant suffix.

Figure 3A:
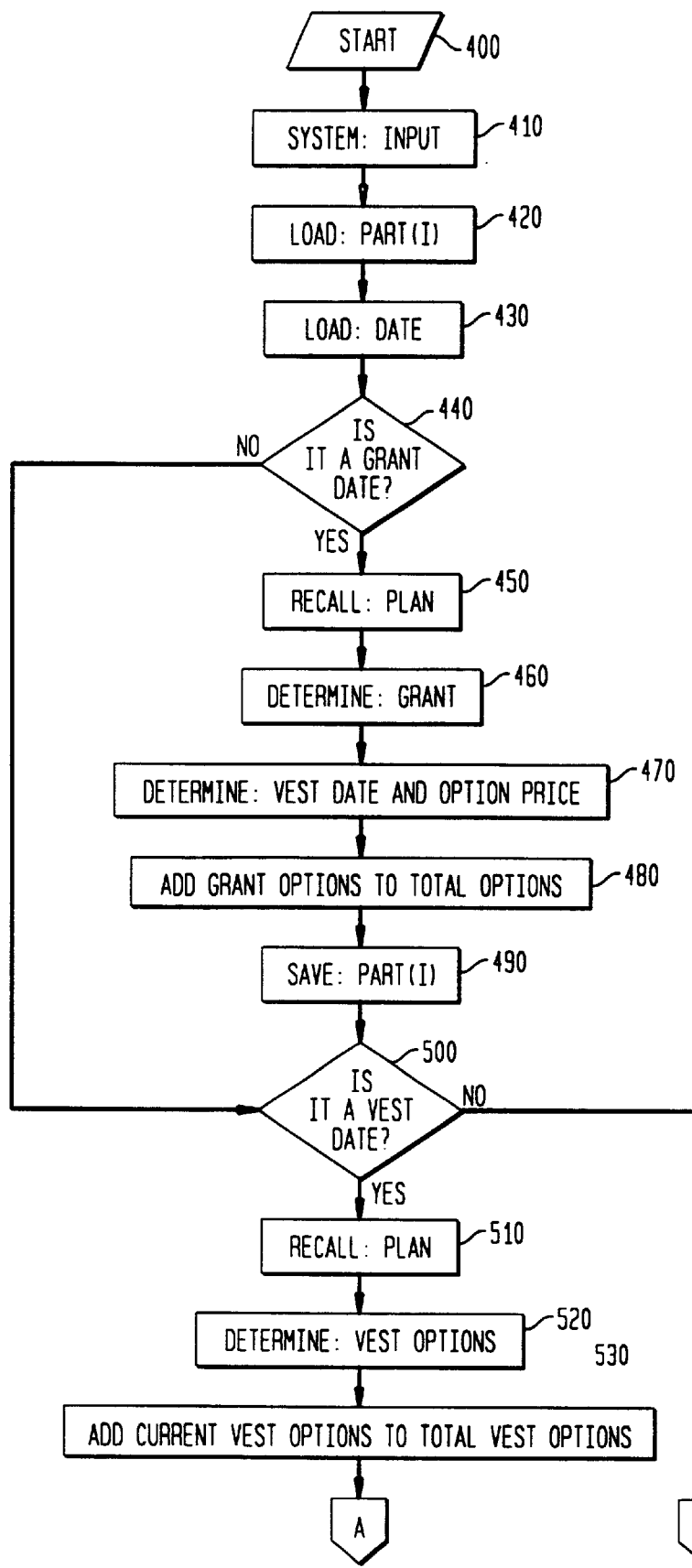
FIG. 3 provides a logic flowchart of the daily transaction processing implemented by the present invention.
Figure 3B:
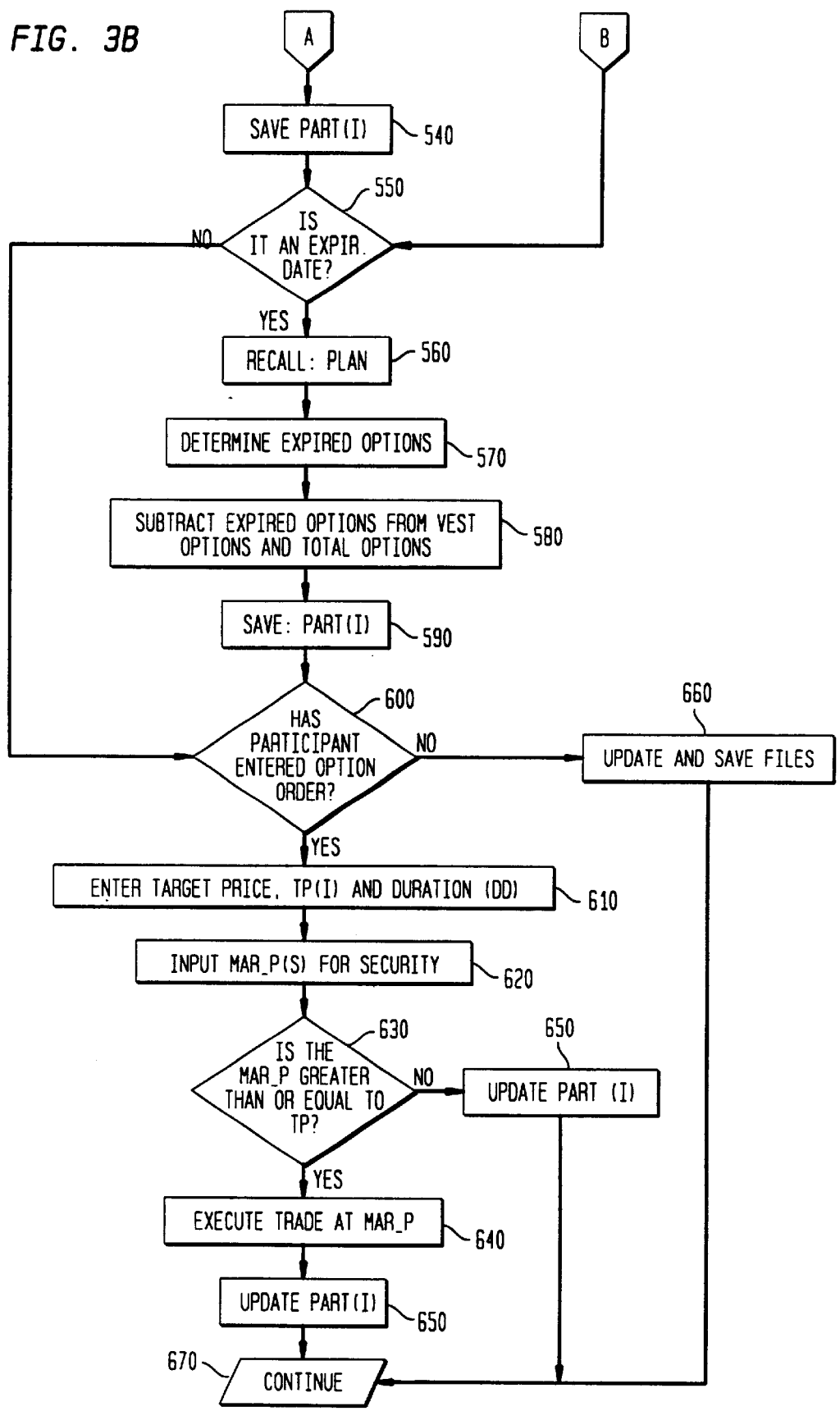

With the above Plan structure for illustration, attention is now directed to FIG. 3 depicting the logic path for the inventive system associated with periodic (daily) account processing. Beginning at block 400, logic uploads the system module at block 410. The system module governs the processing of accounts on the periodic or input driven basis. In this context, input driven processing is exemplified by a transaction request received by telephone from a participant. Periodic processing is time based (e.g., daily) and functions to control time based processing of accounts—for example the removal of vested options after the expiration of a Plan delineated termination period for the option. Other time based processing will include the comparison of current stock price on an exchange with a specified target price in a participant's file with a contingent transaction automatically executed if the price-quote comparison is satisfied. In this context, the current stock price corresponds to some recently completed and fixed transaction, such as "end of day" pricing. Other market pricing techniques may be employed.

Continuing in FIG. 3, at blocks 420 and 430 the system accesses the participant files in sequence for processing in accordance with the Plan dictates for the entered Date. Test 440 determines whether the participant/plan files delineate a grant date for the option account. If so("yes"), logic proceeds to blocks 450–490 wherein the Plan is accessed and used to quantify and confirm the option grant, calculate vest and optionally option price for the newly granted options and update the participant files in accordance therewith.

At test 500, the system determines if the date of processing is a vesting date for that Ith participant; if so, logic proceeds to blocks 510–540 for processing the participant records in accordance with the Plan and specifically updating the options (vested) available for transacting by the participant. The records for the Ith participant are updated with the new information replacing the existing files in the database.

Plan constraints often include time periods for exercising vested options. Therefore, after the passage of time, unexercised vested options will expire. The system module determines this at test 550 for each participant (unless the Plan for that participant has no time based option expiration function). A positive response to test 550 branches to blocks 560–590 wherein the Plan is accessed and the associated expired options removed from the participant's account.

As discussed above, exercise of options by the participant may be accomplished by both direct request or by a time function; this latter course involves the setting of a target price for the shares that is above the current market price, and the setting of transaction time period in terms of start time(or date) and span (duration of requested price delineated transactions). Once evoked, the system must continuously (implemented in incremental updates) receive market data for direct comparison to the target price, and automatically execute the requested transaction upon satisfaction of the target-market price comparison.

The foregoing is accomplished as follows. At test 600, the system determines if a target price exercise order has been entered for the user and if so the target price, TP(I) and the duration DD(I) for the Ith participant, block 610. The system then accesses the current quote for the specified security, designed as MAR_P(D), at block 620 and compares this price data at test 630. If the comparison criteria is met, logic proceeds to block 640 where the system links to an exchange for automatic execution of the options exercised. The participant's account is then updated at block 650. If test 630 is not satisfied, no transaction is authorized for this period and the participant's file is updated accordingly at block 660. The system then increments to the next participant (I+1) for further processing at block 670.

In addition to the entry of time-driven exercise orders, the system preferably can processes exercise orders on an order receipt basis, i.e., order-driven processing at opposed to event-driven processing. In this mode of operation, for example, the system provides two forms of execution to the participant with vested options, funded and cashless. The funded transaction is the traditional mechanism described above for processing options and involves the receipt from the option holder of the share price defined in the option account which is then coupled with additional funds from the option grantor for purchasing the security on the exchange at the strike price of the option. The security is then provided to the plan participant for disposition.

An alternate approach, the cashless approach, does not require any contribution by the participant and is based on the normally common occurrence of an option price that is significantly below the current market price of the security. A cashless transaction involves the disposal of shares at the market price (either treasury shares or previously purchased shares) with the proceeds divided between the client (option grantor, receiving the option price for the sold shares) and the participant (who receives the market price minus option price (i.e., MAR_P–OPT_P) multiplied by the number of shares). This transaction is considered "cashless" because no initial contribution is required by the plan participant option holder.

A third form of option exercise involves the use of stock as directly contributed by the participant to fund the exercise of the options. This stock can be sold at open market with the proceeds used to fund the execution of the option. However, more usually, the participant "swaps" an amount of stock sufficient to exercise the options, and receives the shares represented by the options minus the shares she used for the exercise. For example if the participant has 1000 options (i.e., to purchase 1000 shares) for which the funds required for exercise are equal to the present market value of 100 shares of the same stock presently owned by the participant, the participant will receive 900 shares in a "stock swap" exercise of the options.

Figure 4:
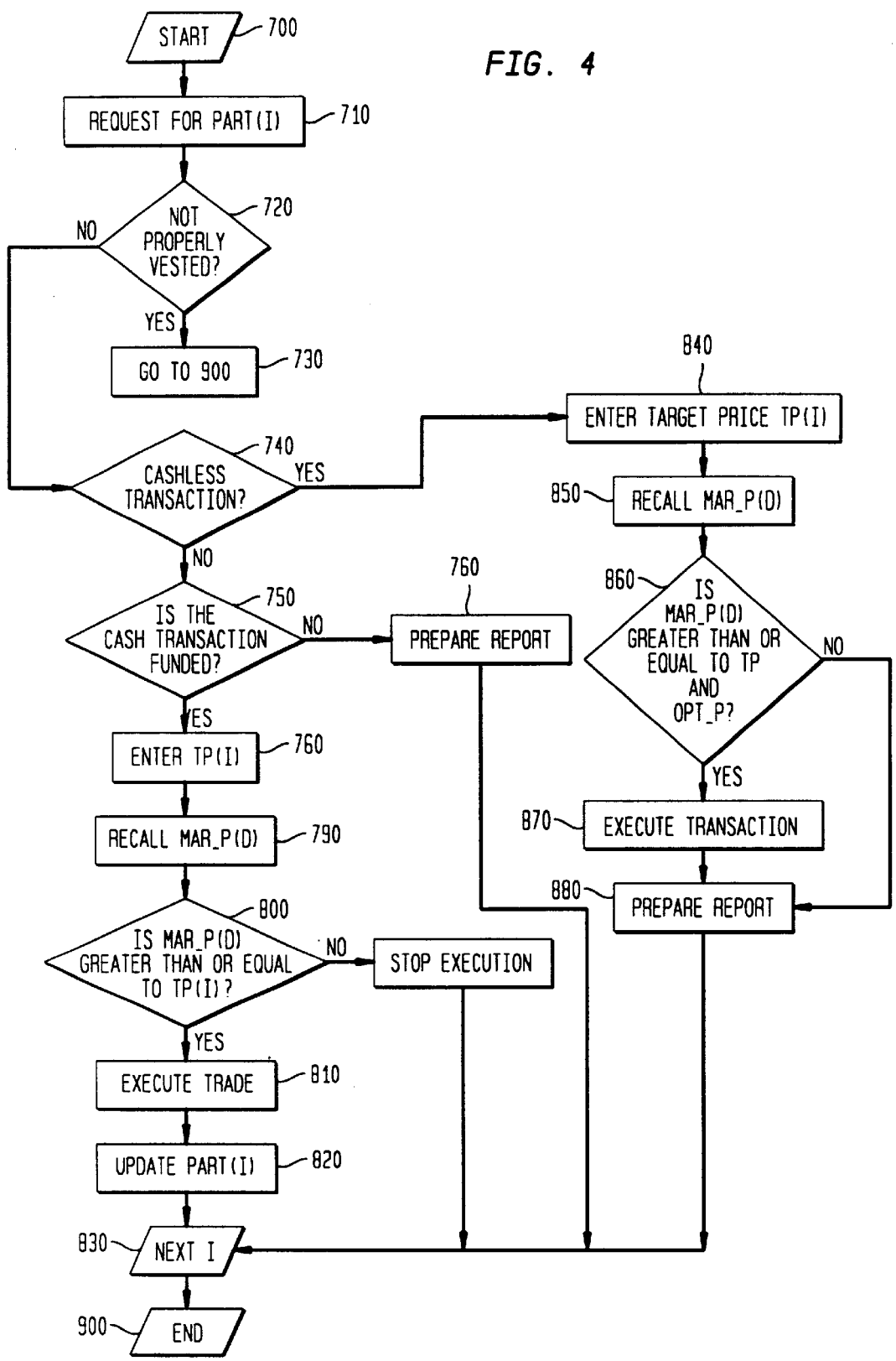
FIG. 4 depicts a logic flowchart of the option exercise module of the present invention.

The foregoing transactions are accomplished by the present system in accordance with FIG. 4. Beginning with start block 700, logic proceeds to block 710 and input of the current queued request for the Ith participant. At test 720, the system first confirms that the participant order is proper, i.e., the current records reflect possession of vested options to support the exercise request for that participant; other confirmation data may be accessed for foreign security laws on ownership, etc. as may be needed.

Assuming a negative response to test 720, logic continues to test 740 wherein the system determines the form of the transaction, i.e., cashless or funded. If the funded request is selected by the participant, logic branches to test 750 to confirm receipt of the necessary funds to support the purchase. As stated earlier, all transactions are based on the use of a concurrent brokerage account and the requisite funds may be established by one of several mechanisms such as margin on existing shares etc. If the transaction as requested is unfunded, ("no" to test 750) the system stops execution of the order and prepares a report, block 760.

If the transaction is fully funded, the system enters the participant selected target price for the transaction, TP(I) and recalls the current market price, MAR_P(D) at blocks 780 and 790 respectively. Test 800 compares the prices for the security with automatic execution of the transaction instituted upon satisfaction of the vest via blocks 810–830. The target price may be and often is set at the current market price by the participant to insure execution of the option (i.e., test 800 always satisfied).

Continuing with FIG. 4 and assuming selection of the cashless exercise, processing proceeds to block 840 for the entry of the target price by the participant. Again the system accesses the current market price for that security and compares this value to the selected target price and additionally the stored option price for that participant. This latter test condition is required as the TP(I) must also support the payment of the option price and the accrued transaction fees pursuant to the designated cashless transaction. Satisfaction of this bifurcated conditional permits automated order execution via the brokerage account for that participant, blocks 870 and 880. Logic then proceeds to the next order in the queue.

Although the entry of option exercise instructions are made on an individual participant basis, the actual implementation of these transactions is done on a client/security basis, i.e., transactions for a given security are accumulated so that the actual trade order that reached the exchange comprises many individual orders combined. The method of accumulation is not critical and may proceed by either a set time period or by volume of transactions is given securities.

Figure 5:
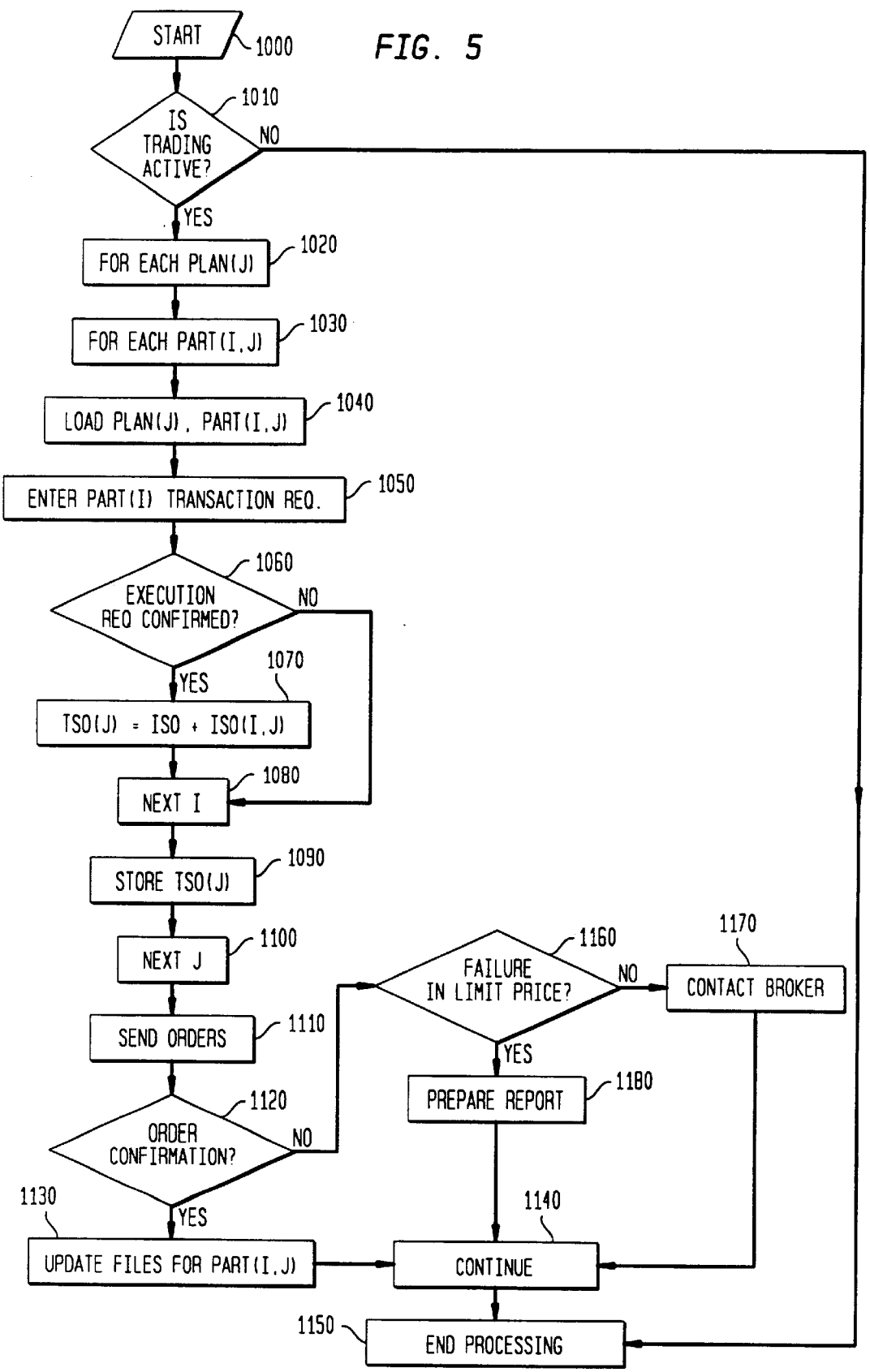
FIG. 5 provides a flowchart for the cumulative trading of shares in accordance with the instructions from participants on a plan or client basis.

This accumulation process is delineated in FIG. 5. At select intervals, the system begins the transaction procedure via start block 1000, confirming the transaction period at test 1010. A "yes" to test 1010 starts the transaction entry process; each plan is accessed and each participant incremented by indexing variables "J" and "I" respectively, blocks 1020–1040. At block 1050, the system accesses the transaction request REQ(I) for the Ith participant. If this REQ is confirmed at test 1060 (meets plan constraints and target price considerations), the system accumulates the optioned shares into the total for that security, block 1070, wherein TSO(J) represents the total stock options for the Jth security and ISO represents the individual stock options REQ by the Ith participant. Logic continues for each Ith participant and Jth Plan with the retention of TSO(J) for all J's in the system, blocks 1080–1100. These collected and confirmed orders are then sent to the exchange for execution, block 1110.

Continuing with FIG. 5, test 1120 confirms that the order as entered on the exchange was executed per instructions. A positive response to test 1120 is followed by system file update with the new information, block 1130. If the order cannot be confirmed, the system determines whether the price limit failure occurred, test 1160. A price limit prevents a rapidly shifting market from causing a negative cash transaction by assuring that the market price received for the security is sufficient to cover the option price plus whatever incidentals may accrue. If a price limit triggered an aborted trade, a report is generated, block 1180; if the trade failed for some other reason (e.g., trading stopped for that security on the exchange) the system contacts the broker to complete the report, block 1170. This ends the processing until the next period or volume limit is reached, block 1150.

With the proliferation of multinational corporations and employees who may likely be working in various countries during their tenure with one or more international companies, the invention also allows for the management of stock option plans where the money used for the exercise transaction, and/or for the disbursement of proceeds (e.g., a "cashless" execution of the option), are in different currencies. In such a system, the participant request (i) the form of option exercise desired (e.g., cashless, regular sale, or cash balance disbursement), (ii) that the proceeds are to be distributed in a particular currency eligible for the plan, and (iii) the desired method of disbursement (e.g., cash or wire transfer). The exercise of the option proceeds as described above with the additional input that the broker (or participant, as described below) enters to indicate that a "foreign" currency transaction is requested, and how the funds are to be disbursed. Preferably, wire transfer instructions and information must be provided by the plan participant prior to execution of this foreign currency transaction; otherwise, measures can be implemented to allow the participant to submit wire transfer authorization and for the broker (or customer service representative) to enter and confirm that information during the participant's online modem or telephone session. The option exercise then proceeds as described above with a disbursement monetary value generated that is due to the participant as well as the type of currency with which the option was exercised and the type of currency that the participant desires to be disbursed. If the two currency types are different, the system queries a database (present in the system or remote accessible online via a service provider) for the exchange rate between the two currencies, and generates a value of the disbursement in the currency type requested by the customer. Preferably, the system also generates a transaction fee for the currency exchange based on a standard rate or such other terms as the plan manager may require or may have agreed with the company whose options are being managed. The system also preferably generates output reports for the manager and/or the participant and/or the company regarding wire transfers and/or currency rate reports (including any applicable exchange transaction fee(s)).

In another embodiment of this invention, it is preferably contemplated that a participant engages the system and exercises vested options without directly contacting a broker. As such, the participant can access the system on a bulletin board directly via modem, a hypertext page (preferably via secure server protocol) on the web portion of the internet, or a menu system via touch-tone telephone as mentioned above. The participant would be required to enter account information and one or more passwords (e.g., a PIN, a personal identification number). Thereafter, the participant enters, for example, information indicative of the particular options to be exercised and, optionally, trading, currency, and/or proceed distribution instructions. For example, the participant can direct the system to exercise specified options only if the price of the underlying security were not less than a given price. Likewise, the participant could direct that the proceeds by distributed in a particular currency, as described above; and that they be wired, mailed, or directly deposited with a specified institution. Further, the VRS preferably responds in a default language (e.g., English, or a language as determine by the plan level rules) particular to the participant, and/or the participant can be presented with a menu prompting for entry of the language in which the participant would like to continue the session. Languages presently preferred for implementing in this system include English, Spanish, German, French, Italian, Portuguese, Dutch, Mandarin (Chinese), Japanese, Tagalog (Philippines), and Malay (Malaysia); other languages can be used or implemented as a particular plan or administrator requires. Similarly, a web site can allow the participant to continue their session on web pages with their particularly preferred language.

As mentioned in various places above, the present system can generate any number of reports in respect of the transactions, options granted, and the like. It is preferred that, via the plan level rules, all reports for a particular client are generated in a designated language. It is particularly preferred that reports, in addition to those mentioned already, also include (i) monthly, quarterly, and/or annual statement reporting on the participants option holdings and activity, (ii) confirmations of the exercise, and (iii) confirmation of the participant's PIN and any other passwords required to access the system.

Figure 6:
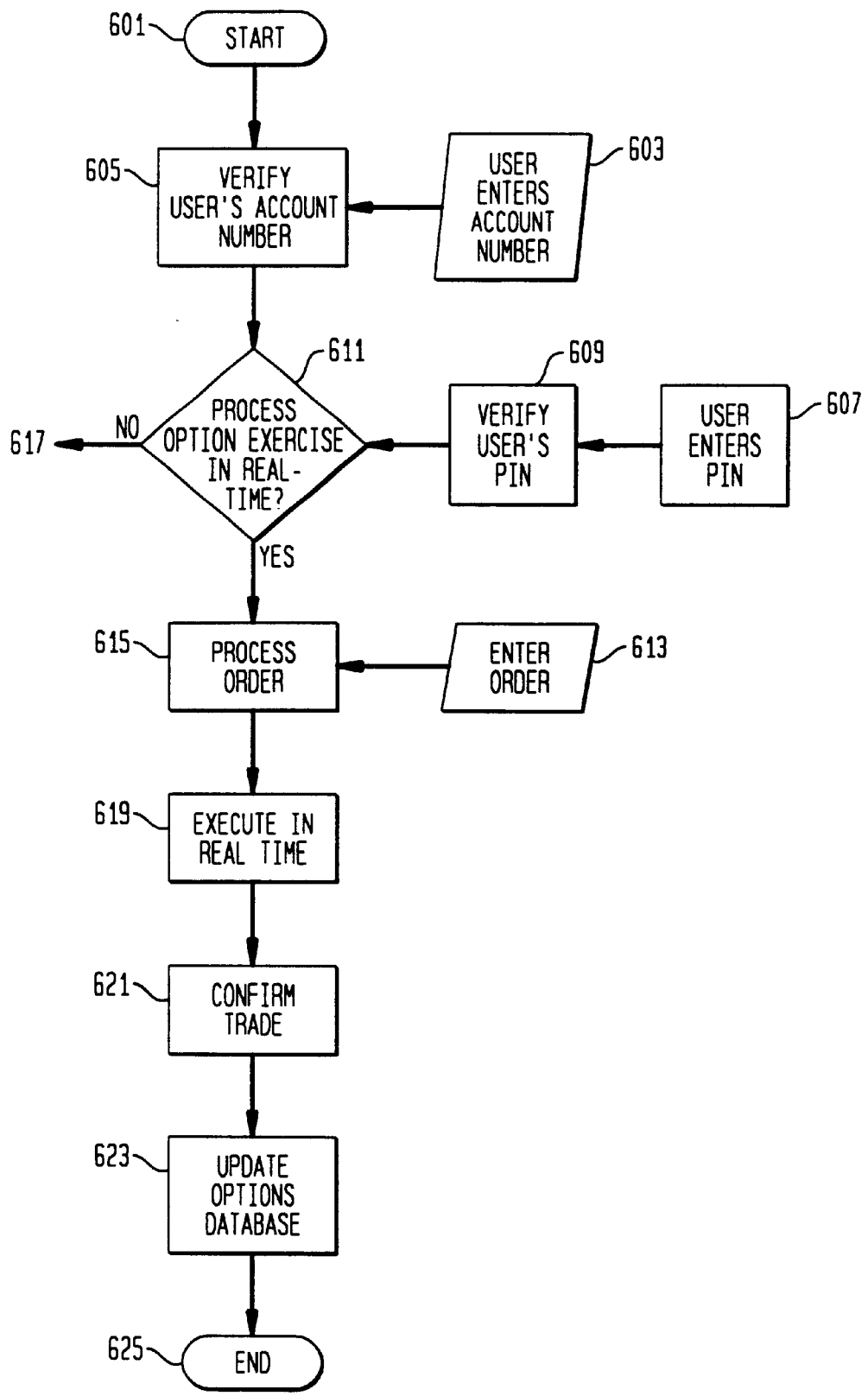
FIG. 6 depicts a flowchart showing a sequence of steps by which the participant can exercise options in real time and other actions taken by the present system.

In yet another embedment, the invention contemplates the real time execution of option exercise, as described in U.S. Pat. No. 4,674,044, entitled "Automated Securities Trading System" (the disclosure of which is incorporated herein by reference). In that system, trades to be executed are collected at the end of the day and processed for a single block trade the following trading day. In the present invention, such a system could have undesirable consequences because one or more such large trades could provide sufficient market pressure to change the price of the underlying security, most likely decreasing its price. When options are executed by insiders, the required disclosure of such exercises, coupled with changes in the underlying security price, could have number of detriments. Accordingly, it is desirable to allow the plan participant to exercise her options in real time under the present system. With reference to FIG. 6, assuming, for example, that the participant calls in by telephone, the participant ("user" in the Figure) starts 601 by calling a predefined telephone number and navigates through various menu options using the touch tone phone keys using known technology (the Voice Response System, "VRS", mentioned above). The user enters her account number 603 which is verified 605 by the system. The user then enters her PIN at 607. The system verifies the user's PIN 609 and decides whether real time trading is an election within the plan 611 by reference to the plan level rules. If real time processing is permitted, the user enters her desired order for the options to be exercised 613 (e.g., number of options to be exercised and type of exercise for all or groups thereof) and the order is processed 615. If real time trading is not permitted, the system branches 617 to process the order in a batch mode (e.g., the order will pend on the system until it can be processed in the normal course of trading). Continuing with the processing, the order is executed 619 in real time such as in the aforementioned U.S. Pat. No. 4,674,044. Afterwards, the trade is confirmed 621 and the relevant databases are updated 623 to reflect the option exercise, after which this portion of the process terminates 625.

In still another embodiment, the present invention contemplates simulations of the tax consequences of an option exercise, especially in combination with the present invention. Income to a plan participant from the exercise of options is likely taxable at the federal, state, and even local levels. To facilitate the participant's decision on how many options should be exercise, and how various options should be exercised (e.g., cashless, exchange, etc.), the invention provides a simulation of the tax consequences of a particular manner of exercising the options. The simulation can be performed at a workstation at which broker can view/run the simulation and communicate with the participant, or, more preferably, the participant can access the simulation via telephone and use of a menuing system or via modem (e.g., a page on the web portion of the internet, or on a bulletin board by direct modem connection). By performing one or more simulations with different parameters, the participant can better decide how the options should be exercised. In an embodiment of such a simulation, the participant first specifies the number of options to be exercised. The Net Shares of stock required for the exercise of the options is determined by:

(Number of Options)−(Required Shares for Stock Swap)−(Share Withholding)−(Shares Sold)=Net Shares of Stock The total taxes are assigned variable: Total Taxes=A
Gross SAR Proceeds=(number of options)×(Stock Price−Grant Price)=B The fees/commissions due to the plan administrator and the SEC can be calculated as follows:

| Fees/Commissions and Residual Proceeds |
| --- |
| Step 1 |
| A − B = C<br>If C > 0<br>    Then [(Stock Sale Proceeds − Option Reimbursement) − C] = Not Gain<br>If C < 0<br>    Then Negative (C) = Residual SAR Proceeds |
| Step 2 |
| Commissions Calculation<br>    Net Gain/Stock Prices × (Plan Commission Schedule) = X<br>        if X ≧ 0.005 then round up to the next penny,<br>        if X < 0.005 then round down.<br>SEC Fee Calculation<br>(Net Gain/300) × .01 = SEC Fee<br>    if SEC Fee goes to thousandths place, then round up to next full hundredth.<br>Transaction Fees (set by the plan administrator)<br>    $3.85 for only CLF for all option types except for "K" and "F". |
| Step 3 |
| Total Fees and Commissions<br>    Commissions + SEC Fee + Transaction Fees = Total Fees/Commissions |

The FICA HI Taxes are calculated according to the following formula:

(Gross Gain)×(FICA Hi % from payroll file)=FICA Hi Taxes Due

FICA OAS Taxes are calculated as follows:

| FICA OAS Taxes |
| --- |
| Step 1 |
| (Gross Gain) × (FICA OAS % from payroll file) = Estimated FICA Tax |
| Step 2 |
| (Estimated FICA Tax) + (Participant YTD FICA OAS Amount) = Subtotal FICA |
| Step 3 (the dollar amount shown can change depending upon IRS regulations) |
| If subtotal FICA ≦ $4054.80<br>    Estimated FICA Tax = FICA OAS Transaction TAX<br>If subtotal FICA > $4058.80<br>    (Subtotal FICA) − (FICA Work 1) = FICA OAS Transaction Tax |

The SUTA and Disability Taxes are calculated according to the following formula:

(Gross Gain)×(SUTA or Disability Tax Rate from Payroll File)= SUTA Taxed Due or Disability Taxes Due From the forgoing, the Total Taxes Due are calculated by the following formula:

(Federal Taxes Due)+(Total State Taxes)+(Total Local Taxes)+
(FICA Hi Taxes Due)+(FICA OAS Transaction Taxes)+(SUTA
Taxes Due)+(Disability Taxes Due)=Total Taxes Due Thereafter, the Net Proceeds can be calculated according to the following summantion:

[(Credit Banance+Check Amount)+Gross Proceeds+(Shares Required×Stock Price)+Gross SAR Proceeds]−[Reimbursement+(Total Tax−Taxes from Share Withholding−Taxes Deferred)+Fees+Commissions+Residual SAR Proceeds]=Net Proceeds Depending upon the type of stock option granted to the participant, which type may have to be entered by the participant or broker, but preferably is in the database, the simulation determines which tax calculations are necessary according, for example, to the following criteria:

For NQO (non-qualified option): Calculate all tax calculations

For ISO (individual stock option)
1. If Qualified
2. Only for Wilmington and Pennsylvania (exceptions, e.g.)
3. If tax deferment is NOT selected Then calculate State and Local
For DISO (deferred ISO):
Calculate State and Local regardless of whether tax deferment was selected; and then
Calculate Federal if tax deferment is NOT selected.
For KEOUP/FSSAR:
Calculate all tax calculations Federal Taxes are calculated Tax (Fed/Int'l)%×Gross Gain= Federal Taxes Due With the qualification that if Share Withholding is selected for tax payment, the tax rate can not be greater than 28%. International taxes can be assumed to be the same as those for the U.S. as an estimation, or specific tax calculations can be provided depending upon the participant's residence, where the proceeds are to be deposited, the location of the underlying security, and so forth.

State Taxes are calculated starting with: for states i=1 to n, $\Sigma (R_{Si} \times A_{Si} \times GG_i)$ where $R_{Si}$ is the tax rate for the ith state, $A_{Si}$ is the state tax allocatble to the ith state, and $GG_i$ is the gross gain, to arrive at Estimated State Taxes. Thereafter, the simulation calculates the Resident State Comparison Rate for each work state individually that has a reciprocity agreement with the resident state (i.e., that state in which the participant has a legal residence for tax purposes) as follows:

Resident State Comparison Rate=Work State allocation rate×resident state tax rate The resident state comparison rate is then compared with the work state tax rate:

If comparison rate>work state tax rate, then offset rate=work state rate (i)

If comparison rate<work state tax rate, then offset rate=comparison rate (ii)

The offset state taxes are calculated as equal to (Offset Rate×Gross Gain).

This procedure is repeated for each work state that has a reciprocity agreement with the resident state. After all applicable offset state taxes have been tabulated by each state, all offset state taxes are summed to arrive at a Total Offset Tax Dollars. The final resident state taxes are computed as the Estimated States Taxes for the Resident state only(i.e., the state in which the participant is a resident) minus the offset rate. The total state taxes are finally computed as the sum of the final resident state taxes plus the Estimated Taxes for all of the work states.

The Local Taxes are calculated simply as localities i=1 to n, $\Sigma (R_{Li} \times A_{Li} \times GG_i)$ where $R_{Li}$ is the tax rate for the ith locality, $A_{Li}$ is the local tax allocatble to the ith locality, and $GG_i$ is the gross gain, to arrive at Estimated Local Taxes.

A screen accessible to the broker or to the participant (e.g., on the web portion of the internet) would preferably include the following fields:

Total Exercise Costs—This shows the sum of the option reimbursement cost, Total Tax, and Fees/Commission.

Share/Cash Withholding—Designated by the tax payment field as an indicator of whether a stock or cash disbursement is requested. If share withholding, this field will reflect the number of shares withheld. All other tax payments will reflect dollar amount of the option exercise without attached SAR taxes if applicable.

Residual SAR Proceeds—SAR proceeds not used to/from a exercise.

Pending Transaction—shows current pending transaction.

Other fields on the screen, along with some associated variables and commands (it being understood that "screen" may run to multiple screens, and that multiple screens may be used to group common or related parameters and results) are shown, along with a preferred arrangement, in the following table:

| | Top of Screen |
|---|---|
| Acct No. | States client's account number |
| Grant Date | Indicated option grant date from database |
| Grant Price | Indicated grant price (strike price) for this option. |
| Status Date | Date of an employee status change. (e.g., if all 0's, the status is active and unchanged). |
| Status | Indicates type of status change; e.g., voluntary or involuntary termination, death, or retired. |
| Available Options | The number of options available to exercise. |
| Available SAR | Available attached SAR's |
| Grant Type | One letter code indicating the grant type |
| | Column One |
| Exercise Type | The exercise method chosen; e.g., C = \CASH, CLP = CASHLESS PARTIAL, CLP = CASHLESS FULL, SS = STOCK FOR STOCK |
| Reload | CASHLESS FULL, SS = STOCK Indicate a "Y" or a "N" to reload the stock option |
| No. of Options | The number of options to use in the transaction |
| Disqualifying ISO | Systematic default will be N unless a disqualifying exercise is placed. An ISO will become disqualified if shares are sold and or taxes are paid with share withholding. The participant can also elect to disqualify an option. |
| Number of SAR's | Total SAR's to use. |
| Tax (Fed/Int'l) | The tax field will read the demographic screen fed tax field for domestic and aggregate tax rate for Int'l. Can adjust upward in increments of .1% up to 39.6% for domestic. International taxes cannot be adjusted. The Federal tax will be added to all other taxes provided in a demographic feed for calculations. |
| Stock Price | Current stock price for model |
| Tax Payment | Method for paying taxes. C = Credit Balance/Check amount, S = Share Withholding, D = Tax Deferral, and P = Stock Sale |
| Credit Balance | Amount of cash to be used for exercise from cash balance. |
| Check Amt | Total check participant will use to complete a cash exercise (Use in the case of wired funds as well.) |
| Share Amount | The amount of shares used from the account to complete a stock for stock exercise. |
| Shares Attested | The amount of shares used from outside accounts to complete a stock for stock exercise. |

-continued

| | |
|---|---|
| Use price as limit | Indicate a "Y" or "N" if the stock price entered in the model will be used as the limit price for a real time trade. Indicate "N" for a market order. |

Column Two

| | |
|---|---|
| Exercise Type | The type of exercise will be spelled out fully. C = Cash, CLP = CASHLESS PARTIAL, CLF = CASHLESS FULL, SS = STOCK FOR STOCK |
| Net Shares | The shares that will be received by the participant. The following is the calculation: Options − Required Shares for Stock Swap − Share Withholding − Shares Sold = Net Shares |
| Net Proceeds | Any cash that will be received by the participant from a option exercise. The following is a calculation: [(Credit Balance + Check Amount) + Gross Proceeds + (Shares Required × Stock Price) + Gross SAR Proceeds] − [Reimbursement + (Total Tax − Taxes form Share Withholding − Taxes Deferred) + Fees + Commissions + Residual SAR Proceeds] = Net Proceeds |
| SAR Proceeds | Information displayed whenever a SAR or a Unit Option is exercised with the net proceeds generated from a SAR exercise or Unit surrender. The following is a calculation: (Stock Price − Grant Price) × # of SAR's − SAR taxes = SAR Proceeds |
| Required Cash Amount | The minimum cash needed to complete a cash exercise. |
| Requires Shares for SS | Calculation of the total shares required to do a stock for stock exercise. The following is a calculation: [(number of options × grant price)]/stock price = required shares |
| Stock Sale Proceeds | Total proceeds generated by a stock sale on a exercise |

The above-described arrangement is merely illustrative of the principles of the present invention. Modifications and adaptations thereto will be apparent to those skilled in the art upon perusing this specification, and such are intended to be within the scope and spirit of the present invention.

What is claimed is:

1. A data processing method for managing J client stock option plans, wherein for each Jth client's plan there are I participants in the plan, where J and I are positive whole numbers, comprising:

storing the identity of each client;

storing the identity of each participant for each said client;

creating one or more accounts, each said account associated with a participant;

storing information in each said account regarding stock options held by said participant under the stock option plan, said information comprising:

the number of options for shares of stock in each participant's stock option plan;

the strike price of each said stock option; and a date on which each said stock option is vested, said date calculated at least in part by an axiomatic rule system;

monitoring the current market price for the stock underlying each option;

receiving from a participant an order to execute a trade exercising a vested stock option in said participant's plan;

executing said trade on said vested stock option when the market price equals or exceeds the strike price of said vested stock option to receive the shares underlying the option exercised.

2. The method of claim 1, further comprising:

providing at leas one system selected from the following: for (a) converting and disbursing currency received from implementing said option transaction into a different currency;

(b) brokering the transaction in real time; and/or (c) simulating an option transaction and outputting the expected results from the transactions prior to the actual implementation of the option transaction requested.

3. The method of claim 1, further comprising:

accumulating said orders to execute a trade received from each said Ith participant of said J clients prior to executing; and exercising said accumulated orders in blocks.

4. The method of claim 1, wherein said trade is executed without funds advanced by said participant.

5. The method of claim 4, further comprising:

receiving the stock from said execution of said option;

retaining a portion of said received stock approximately equal in value to the value of the option exercised.

6. The method of claim 5, wherein said system is operated by an administrator, and further comprising retaining an additional portion of said received stock as payment to the administrator for brokering the trade.

7. The method of claim 1, wherein the participant advances funds in an amount for exercising said vested option.

8. The method of claim 2, wherein said system is operated by an administrator, and wherein the participant also advances funds to compensate said administrator for brokering the trade.

9. The method of claim 8, further comprising:

selling the stock received as underlying the executed option and receiving funds therefor.

10. The method of claim 9, wherein said system is operated by an administrator, and further comprising:

retaining a portion of the funds received from selling the underlying stock for said administrator as payment for brokering said transaction.

11. The method of claim 1, wherein the order from the participant is received by telephonic communication.

12. The method of claim 11, wherein the order is received by a voice response system.

13. The method of claim 9, further comprising:

calculating applicable taxes on the exercise of the option and/or the selling of the underlying stock received;

deducting from the funds received at least one applicable tax to arrive at a value of funds due the participant; and forwarding to said participant funds less at least one tax deducted.

* * * * *